US007303319B2

(12) United States Patent
Holtz et al.

(10) Patent No.: US 7,303,319 B2
(45) Date of Patent: Dec. 4, 2007

(54) HEADLIGHT LENS FOR A MOTOR VEHICLE HEADLIGHT

(75) Inventors: Steffen Holtz, Jena (DE); Alois Willke, Buseck (DE)

(73) Assignee: Doctor Optics GmbH (DE)

( * ) Notice: Subject to any disclaimer, the term of this patent is extended or adjusted under 35 U.S.C. 154(b) by 28 days.

(21) Appl. No.: 11/074,984

(22) Filed: Mar. 7, 2005

(65) Prior Publication Data

US 2005/0207164 A1 Sep. 22, 2005

(30) Foreign Application Priority Data

Mar. 7, 2004 (DE) ...................... 10 2004 011 104

(51) Int. Cl.
*G01B 5/00* (2006.01)

(52) U.S. Cl. ....................................... 362/462; 362/540

(58) Field of Classification Search ................ 362/812, 362/462, 463, 540, 806; 40/219, 595, 486, 40/480; 359/642, 819, 707
See application file for complete search history.

(56) References Cited

U.S. PATENT DOCUMENTS 2,596,879 A * 5/1952 Warren et al. ................ 40/541
2,824,399 A * 2/1958 Neugass ....................... 40/546
2,918,034 A * 12/1959 Neugass ..................... 116/287
5,434,754 A * 7/1995 Li et al. ..................... 362/511
5,621,571 A * 4/1997 Bantli et al. ................ 359/529
5,652,565 A * 7/1997 Salcedas et al. ............ 340/479
2004/0240055 A1* 12/2004 Teramoto et al. ........... 359/457

FOREIGN PATENT DOCUMENTS

| | | |
|---|---|---|
| DE | 36 02 262 | 5/1987 |
| DE | 299 12 504 | 9/1999 |
| DE | 198 29 586 | 1/2000 |
| DE | 199 33 766 | 5/2001 |
| DE | 100 52 653 | 5/2002 |
| DE | 101 18 687 | 10/2002 |

(Continued)

OTHER PUBLICATIONS

International Search Report, Appln. No. PCT/EP2005/001931, filed Feb. 24, 2005.

(Continued)

*Primary Examiner*—Jong-Suk (James) Lee
*Assistant Examiner*—Julie A. Shallenberger
(74) *Attorney, Agent, or Firm*—Kenyon & Kenyon LLP

(57) ABSTRACT

The present invention relates to a headlight lens for a vehicle headlight having a light source, in particular for a motor vehicle headlight, as well as a vehicle headlight, in particular a motor vehicle headlight, having a light source and a headlight lens. The headlight lens including a lens body is made of a transparent material, which includes a surface to face the light source and a surface to face away from the light source. The headlight lens having an emblem, on the surface to face the light source, having a basal surface, which, with respect to the surface to face the light source or with respect to an optical axis of the headlight lens, is sloped in such a way that light entering into the lens body through the surface to face away from the light source parallel to the optical axis of the headlight lens is subject to a total reflection at the basal surface.

25 Claims, 10 Drawing Sheets

FOREIGN PATENT DOCUMENTS

Figure 1:
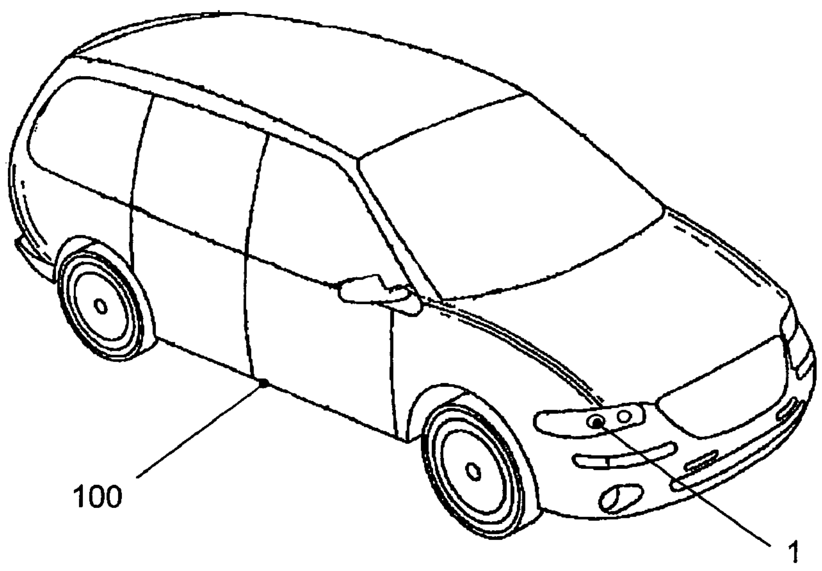

| | | |
|---|---|---|
| DE | 103 11 688 | 9/2004 |
| EP | 0 791 911 | 8/1997 |
| EP | 1 254 810 | 11/2002 |
| JP | 07 002017 | 1/1995 |
| WO | 02/31543 | 4/2002 |
| WO | 03/074251 | 9/2003 |
| WO | 2005/086125 | 9/2005 |

OTHER PUBLICATIONS

Patent Abstracts of Japan vol. 1995, No. 04, May 31, 2005.

* cited by examiner

HEADLIGHT LENS FOR A MOTOR VEHICLE HEADLIGHT

REFERENCE TO RELATED APPLICATION(s)

The present application claims priority to German Patent Application Serial No. 10 2004 011104, filed Mar. 7, 2004, the entire contents of which are hereby expressly incorporated by reference in their entirety.

The present invention relates to a headlight lens for a motor vehicle headlight, particularly for a motor vehicle headlight as well as a vehicle headlight. A headlight lens of this kind is known e.g. from WO 02/31543 A1, which discloses a headlight lens of a vehicle for installation in front of a light source in a headlight housing, the lens including outer sides, which bound a solid body made of a transparent material, the solid body containing means of refracting light, which are situated in the interior of the solid body at a certain distance from the outer sides.

An above-mentioned headlight lens is furthermore known from WO 03/074251 A1, from DE 36 02 262 C2 and DE 100 52 653 A1, DE 36 02 262 C2 disclosing a headlight lens having at least on one side a convexly curved surface and means for correcting chromatic deviations of a light beam, the means for correcting the chromatic deviations being formed by the at least one convexly curved surface, which takes an aspherical form and is divided into several aspherically formed partial surfaces of different form or curvature.

DE 299 12 504 U1 discloses a vehicle headlight having a saucer-shaped reflector, having a light source associated with the reflector, having a lens situated in the ray path of the reflector, which has a flat surface facing the reflector and a convex surface facing away from the reflector, and having a covering screen adjacent to the convex surface of the lens, the lens being provided exclusively in a central region of its flat surface with a surface structure created by sandblasting, which reflects and diffusely scatters light rays of the sun entering from outside into the headlight and the lens.

Additional vehicle headlights are known e.g. from DE 199 33 766 A1, from DE 101 18 687 A1 and DE 198 29 586 A1.

Due to the strong influence of the vehicle design on the image of a motor vehicle, motor vehicle headlights are today more strongly subject to design influences than in the past. Therefore, in the construction and design of headlights for motor vehicles, appropriate boundary conditions must be considered. Due to the sculptured surface technology in modern vehicle headlights, conventionally structured cover panes or lenses may be replaced by cover panes made of clear glass. This, however, also brings with it the necessity of designing the inner life of the headlight according to criteria of design technology, which in turn results in problems of lighting technology, e.g. a so-called self-blinding of a driver of the motor vehicle caused by deflected portions of light.

In addition to these boundary conditions in the manufacture of vehicle headlights there is the desire that vehicle headlights are to fulfill an origin-indicating function or customized design specifications, so that the make or the type of vehicle is recognizable when seeing the vehicle headlights.

The objective of the present invention is to provide for an origin-indicating function or customized design specifications in the use of a vehicle headlight without restricting the functionality of the headlight as a device of lighting technology.

The aforementioned objective is achieved by a headlight lens for a vehicle headlight having a light source, particularly for a motor vehicle headlight, the headlight lens including a lens body made of a transparent material, which includes an, e.g. essentially flat, surface to face the light source and an, e.g. essentially convex, surface to face away from the light source, the headlight lens having on the surface to face the light source an emblem having a basal surface, which with respect to the surface to face the light source or with respect to an optical axis of the headlight lens is sloped in such a way that light entering into the lens body through the surface to face away from the light source parallel to the optical axis of the headlight lens is subject to a total reflection at the basal surface. An emblem in the sense of the present invention may be e.g. writing, a geometric figure, an assemblage of geometric figures or another symbol.

A basal surface in the sense of the present invention has in particular a constant slope. The slope of the basal surface, however, may possibly also vary slightly within the limits set by the claims. Thus, for example, it is possible to provide for the slopes of the basal surface on opposite ends of the basal surface to differ by 5° or 10°. A basal surface in the sense of the present invention has in particular an extension of at least 10 $mm^2$. A basal surface in the sense of the present invention is in particular a macrostructure, not a microstructure.

In a refinement of the present invention, the basal surface is offset by between 0.2 mm and 6 mm (in the direction of the optical axis) with respect to the surface to face the light source.

In a further refinement of the present invention, the emblem extends into the lens body or in a relief-like manner beyond a part of the surface to face the light source or of the surface to face away from the light source. In a further refinement of the present invention, the emblem is situated in a recess in the lens body and extends in particular in a relief-like manner beyond a bottom surface of the recess.

In a further refinement of the present invention, a projection of the basal surface onto the surface to face the light source covers less than 30% of the surface to face the light source, or a projection of the basal surface onto the surface to face away from the light source covers less than 30% of the surface to face away from the light source.

In a further refinement of the present invention, the surface to face the light source and/or the surface to face away from the light source and/or surfaces of emblems or recesses have a region having a roughness of at least 0.05 μm, particularly at least 0.08 μm, in particular while maintaining a light transmission at the surface of at least 90%. The region having a roughness of at least 0.05 μm, particularly at least 0.08 μm, while maintaining a light transmission at the surface of at least 90%, may surround the emblem on the surface to face the light source and/or on the surface to face away from the light source, in particular in a ring-shaped manner. Alternatively or additionally, the surface to face the light source has at least in a considerable part a roughness of at least 0.05 μm, particularly at least 0.08 μm, while maintaining a light transmission at the surface of at least 90%, if the emblem is situated on the surface to face away from the light source.

A light transmission at the surface of at least 90% in the case of a surface roughness of at least 0.05 μm, in particular at least 0.08 μm, may be achieved in that the headlight lens is blank molded using a mold which has been roughened in the appropriate regions, e.g. by sandblasting, grinding, or spark erosion.

The aforementioned objective is also achieved—in particular in connection with aforementioned features—by a headlight lens for a vehicle headlight having a light source, in particular for a motor vehicle headlight, the headlight lens including a lens body made of a transparent material, which has an, e.g. essentially flat, surface to face the light source and an, essentially convex, surface to face away from the light source, and the headlight lens on the surface to face the light source having an emblem having a basal surface, which with respect to the surface to face the light source is sloped at an angle between 25° and 800, particularly between 350 and 60°, or with respect to an optical axis of the headlight lens is sloped at an angle between 10° and 65°, particularly between 30° and 55°.

The aforementioned objective is also achieved—in particular in connection with aforementioned features—by a headlight lens for a vehicle headlight having a light source, in particular for a motor vehicle headlight, the headlight lens including a lens body made of a transparent material, which has an, e.g. essentially flat, surface to face the light source and an, e.g. essentially convex, surface to face away from the light source, and the headlight lens on the surface to face the light source or on the surface to face away from the light source having an emblem having a basal surface, which is offset by between 0.2 mm and 6 mm (in the direction of the optical axis) with respect to the surface to face the light source or with respect to the surface to face away from the light source.

The aforementioned objective is furthermore achieved by a headlight lens for a vehicle headlight having a light source, particularly for a motor vehicle headlight, the headlight lens including a lens body made of a transparent material, which includes an essentially flat surface and an essentially convex surface, and the headlight lens on the essentially flat surface having an emblem having a basal surface, which with respect to the essentially flat surface or with respect to an optical axis of the headlight lens is sloped in such a way that, light entering into the lens body through the essentially convex surface parallel to the optical axis is subject to a total reflection at the basal surface. An emblem in the sense of the present invention may be e.g. writing, a geometric figure, an assemblage of geometric figures or another symbol.

In one refinement of the present invention, the basal surface is offset by between 0.2 mm and 6 mm (in the direction of the optical axis) with respect to the essentially flat surface.

In a further refinement of the present invention, the emblem extends into the lens body or relief-like beyond a part of the essentially flat surface or of the essentially convex surface. In a further refinement of the present invention, the emblem is situated in a recess in the lens body and extends in particular in a relief-like manner beyond a bottom surface of the recess.

In a further refinement of the present invention, a projection of the basal surface onto the essentially flat surface covers less than 30% of the essentially flat surface or a projection of the basal surface onto the essentially convex surface covers less than 30% of the essentially convex surface.

In a further refinement of the present invention, the essentially flat surface and/or the essentially convex surface and/or surfaces of emblems or recesses have a region have a roughness of at least 0.05 μm, particularly at least 0.08 μm, while maintaining a light transmission at the surface of at least 90%. For this purpose, the region having a roughness of at least 0.05 μm, particularly at least 0.08 μm, may on the essentially flat surface and/or on the essentially convex surface surround the emblem, particularly in a ring-shaped manner. Alternatively or additionally, the essentially flat surface has at least in a considerable part a roughness of at least 0.05 μm, particularly at least 0.08 μm, while maintaining a light transmission at the surface of at least 90%, if the emblem is situated on the essentially convex surface.

The aforementioned objective is also achieved—in particular in connection with aforementioned features—by a headlight lens for a vehicle headlight having a light source, in particular for a motor vehicle headlight, the headlight lens including a lens body made of a transparent material, which includes an essentially flat surface and an essentially convex surface, and the headlight lens on the essentially flat surface having an emblem having a basal surface, which with respect to the essentially flat surface is sloped at an angle between 25° and 800, particularly between 35° and 60°, or with respect to an optical axis of the headlight lens is sloped at an angle of between 10° and 65°, particularly between 30° and 550.

The aforementioned objective is also achieved—in particular in connection with the aforementioned features—by a headlight lens for a vehicle headlight having a light source, in particular for a motor vehicle headlight, the headlight lens including a lens body made of a transparent material, which includes an essentially flat surface and an essentially convex surface, and the headlight lens on the essentially flat surface or on the essentially convex surface having an emblem having a basal surface, which, with respect to the essentially flat surface or with respect to the essentially convex surface, is offset by between 0.2 mm and 6 mm (in the direction of the optical axis).

The aforementioned sloped basal surfaces have in a refinement of the present invention a roughness of less than 0.08 μm, particularly of less than 0.05 μm.

A refinement of the present invention may provide for bottom surfaces of recesses of the essentially flat surface or of the surface to face the light source, which are not to be allocated to the basal surface, to have a region having a roughness of at least 0.05 μm, particularly at least 0.08 μm, particularly while maintaining a light transmission at the surface of at least 90%.

Roughness in the sense of the present invention is to be defined in particular as $R_a$, in particular in accordance with ISO 4287.

A motor vehicle in the sense of the present invention is in particular a land vehicle that may be used individually in road traffic. In particular, motor vehicles in the sense of the present invention are not restricted to land vehicles having an internal combustion engine.

Figure 2:
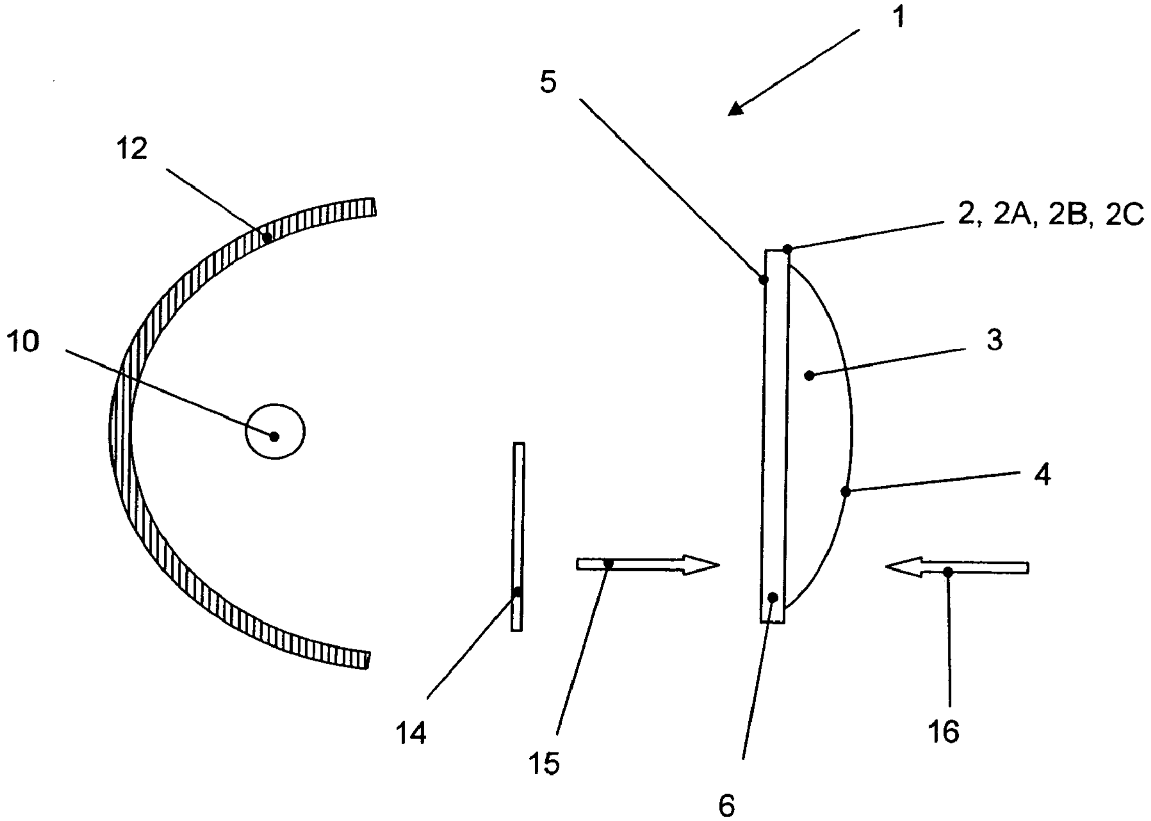
Figure 3:
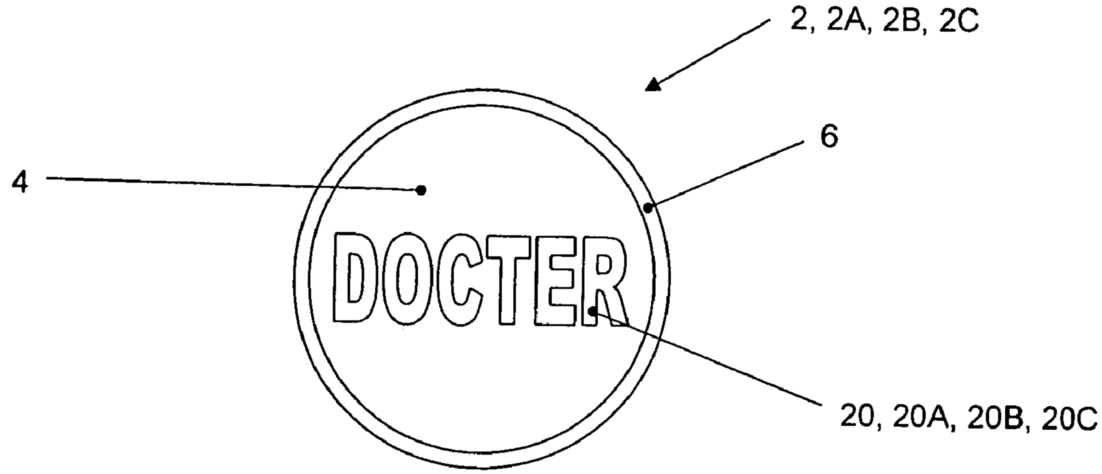
Figure 4:
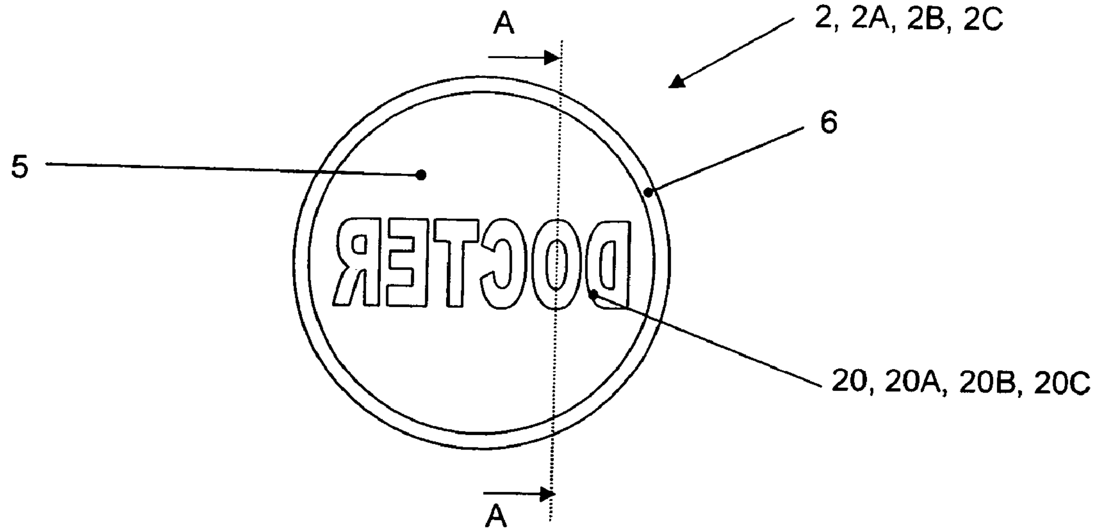
Figure 5:
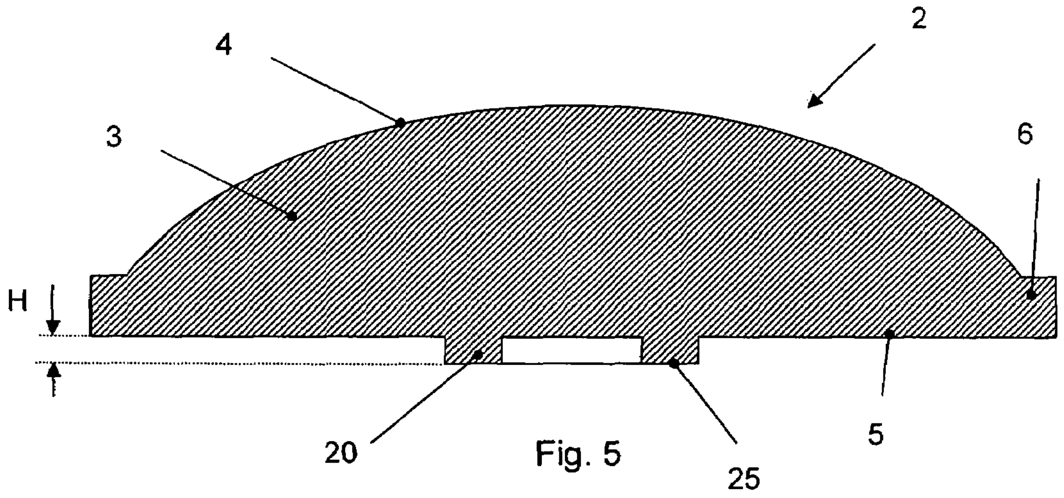
Figure 6:
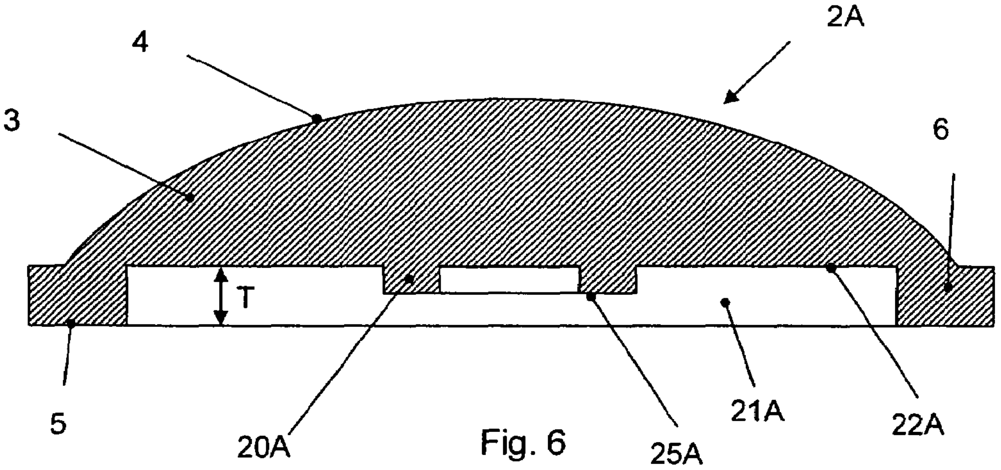
Figure 7:
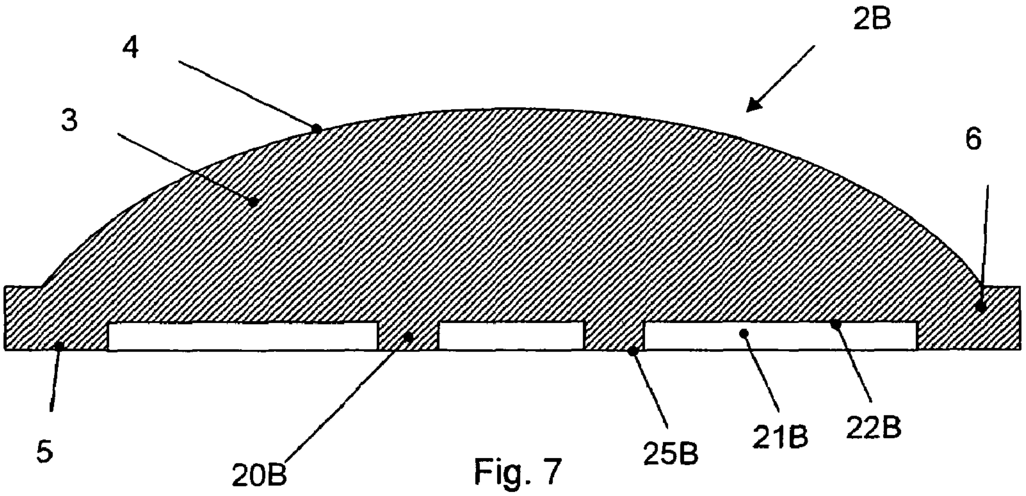
Figure 8:
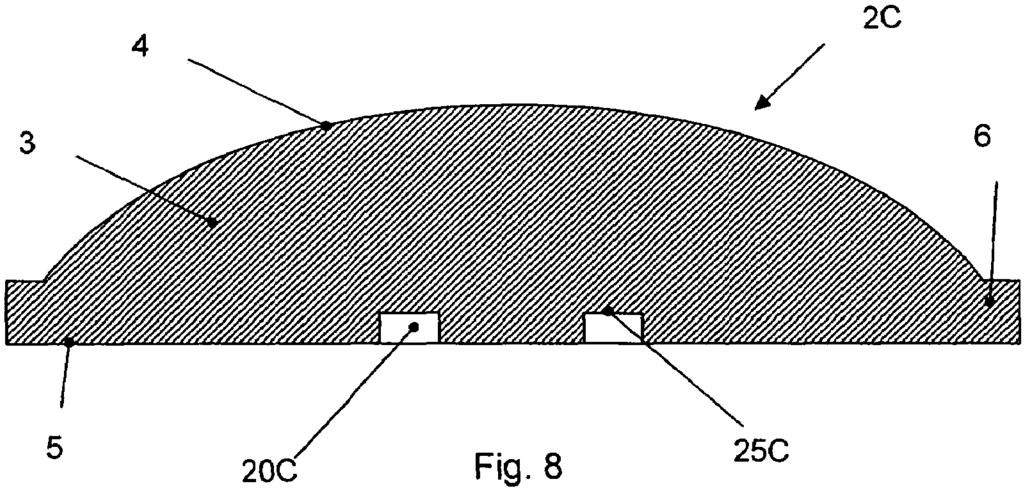
Figure 9:
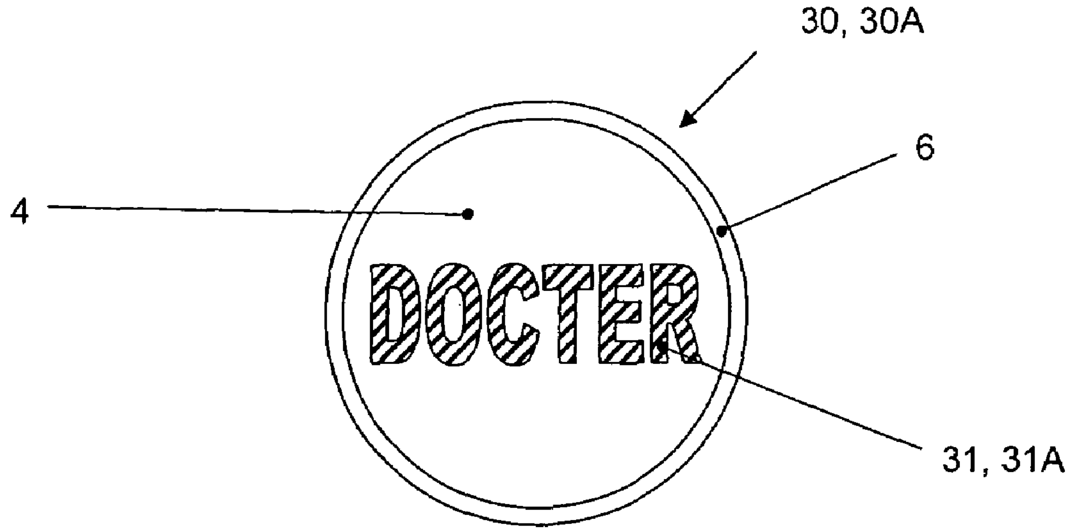
Figure 10:
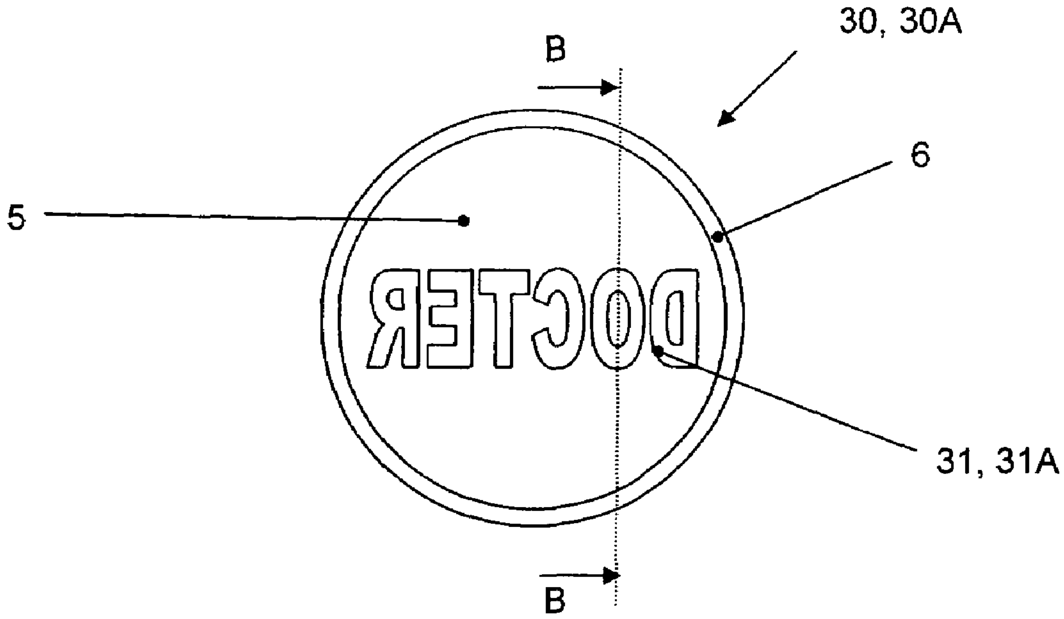
Figure 11:
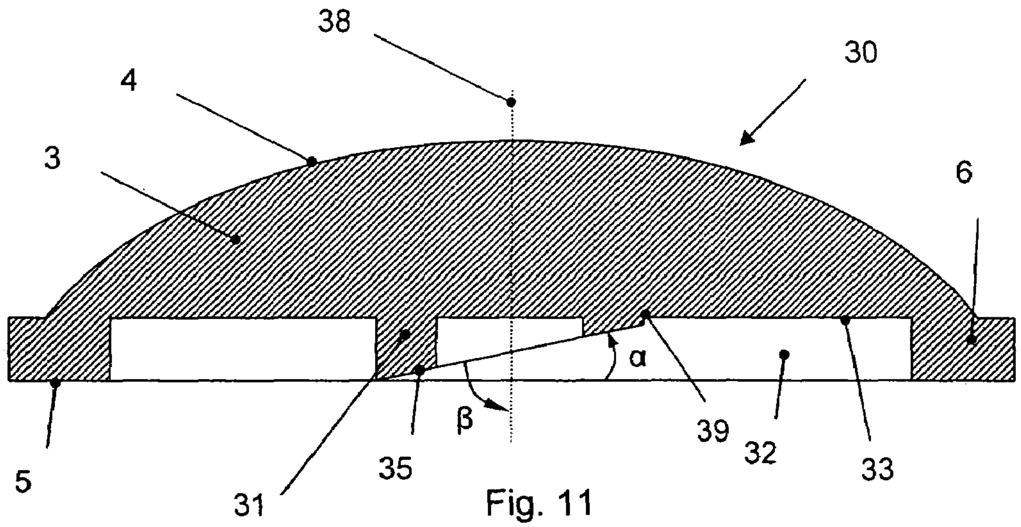
Figure 12:
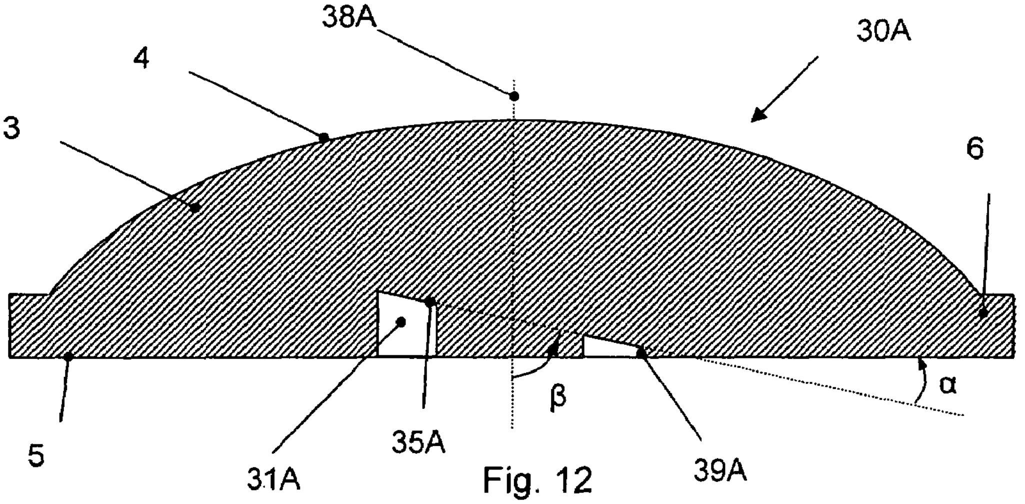
Figure 13:
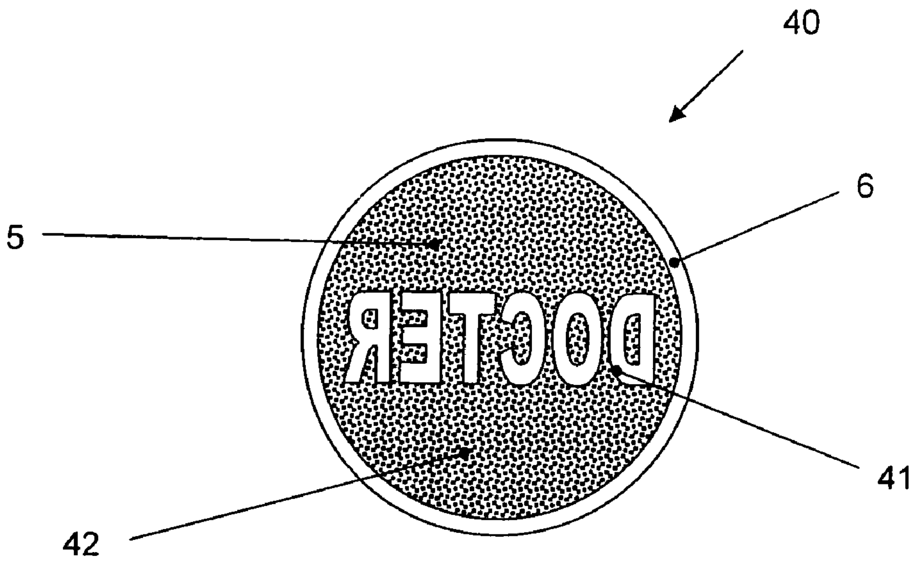
Figure 14:
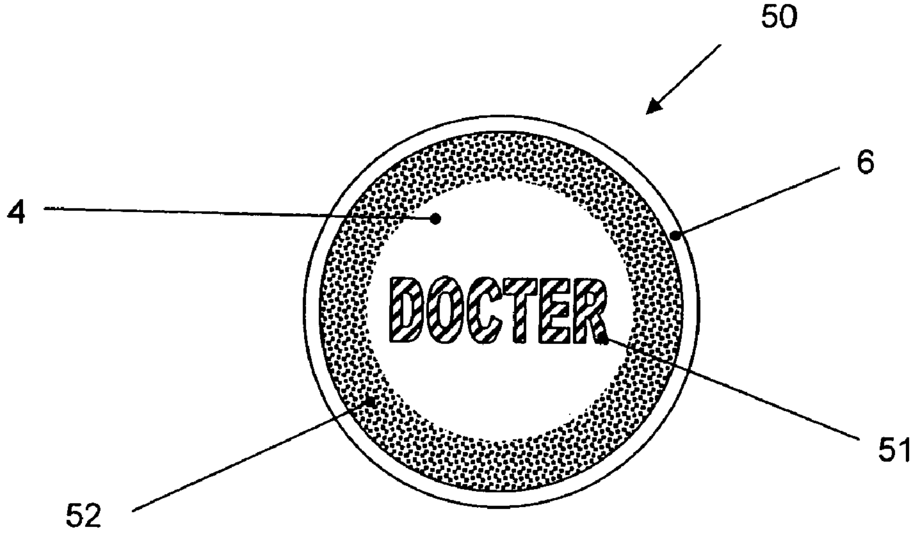
Figure 15:
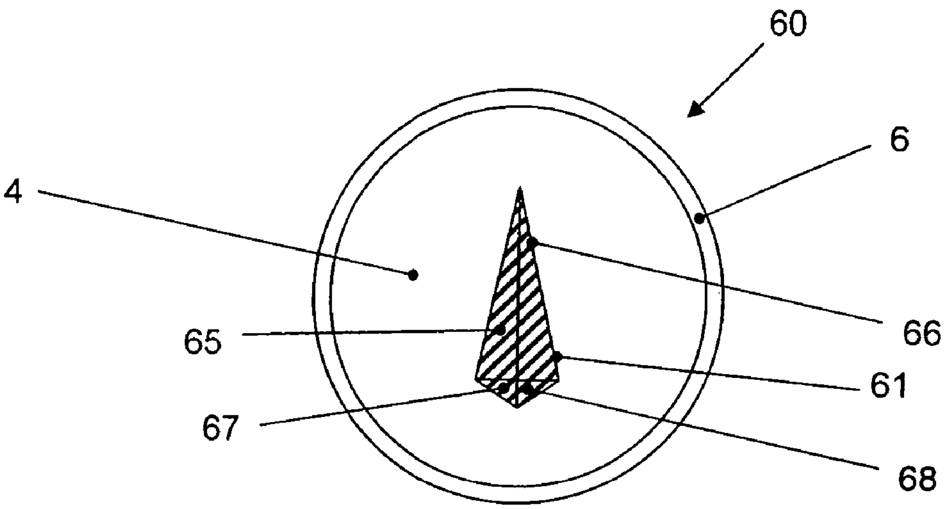
Figure 16:
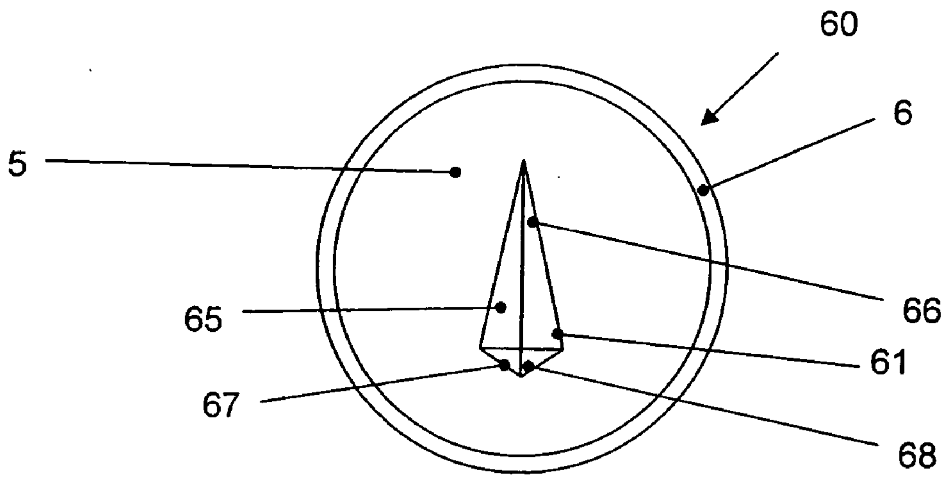
Figure 17:
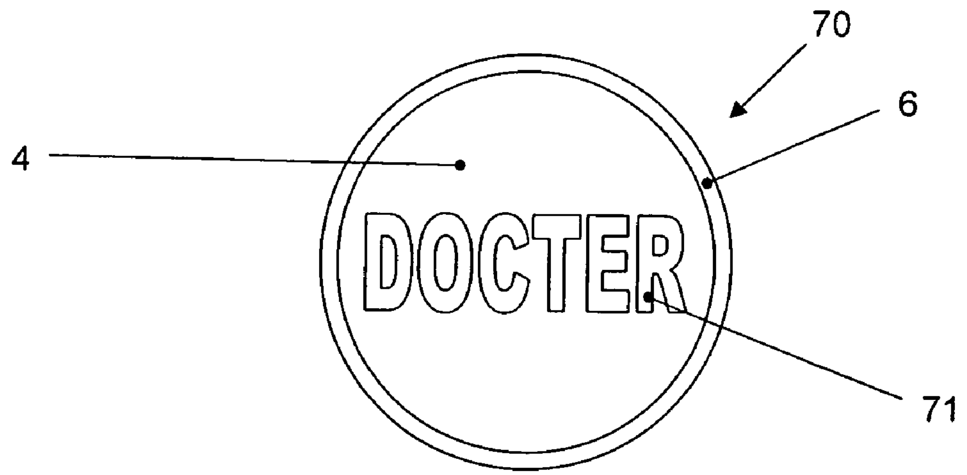
Figure 18:
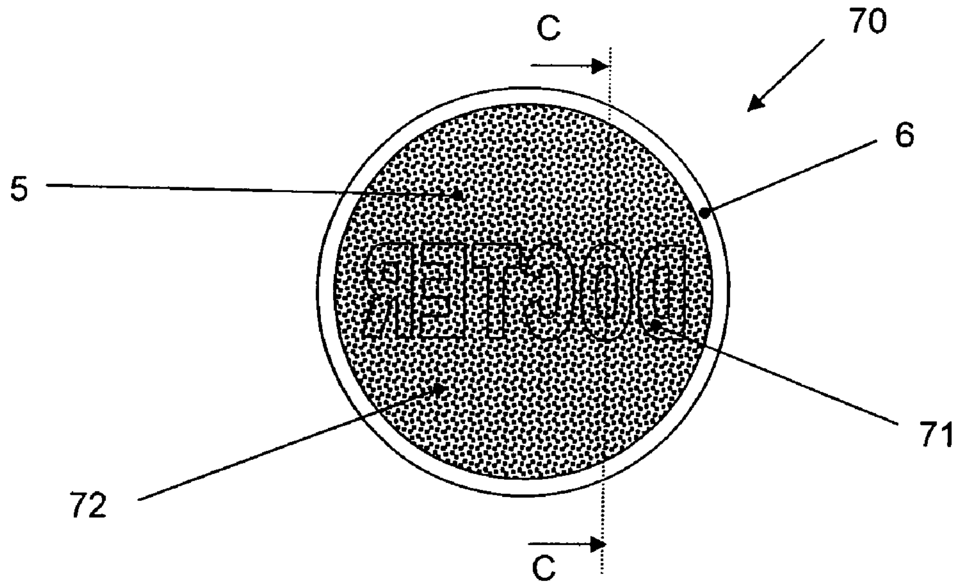
Figure 19:
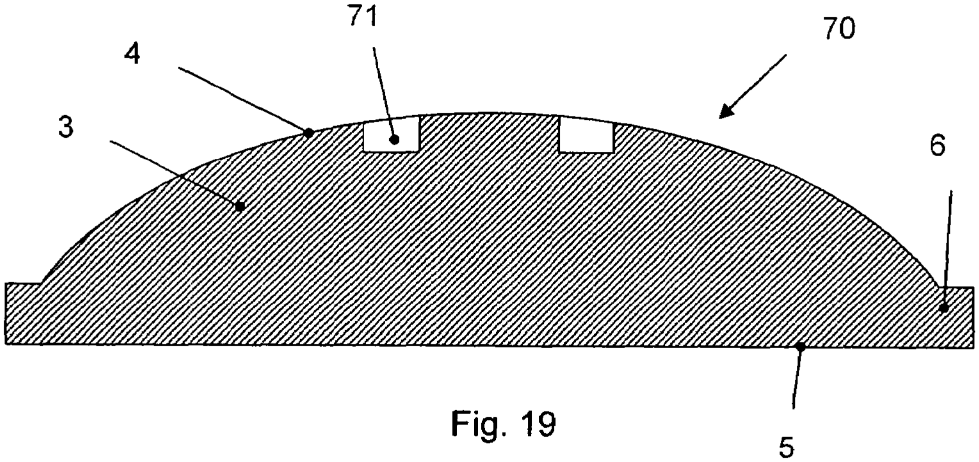
Figure 20:
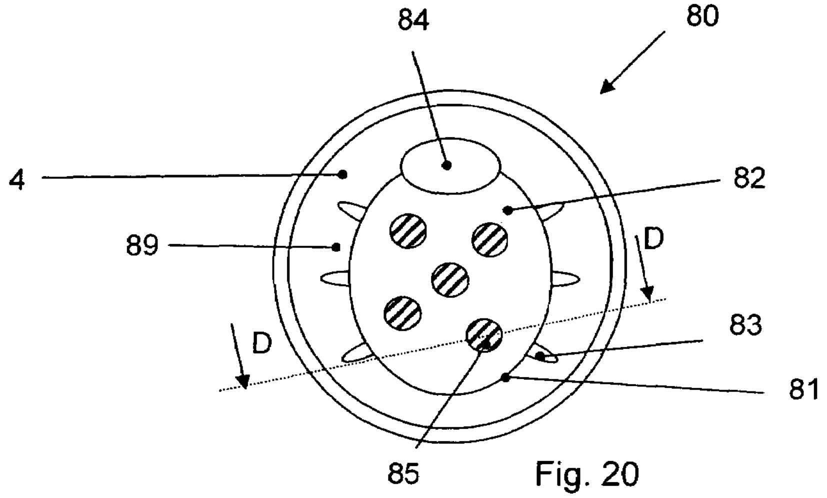
Figure 21:
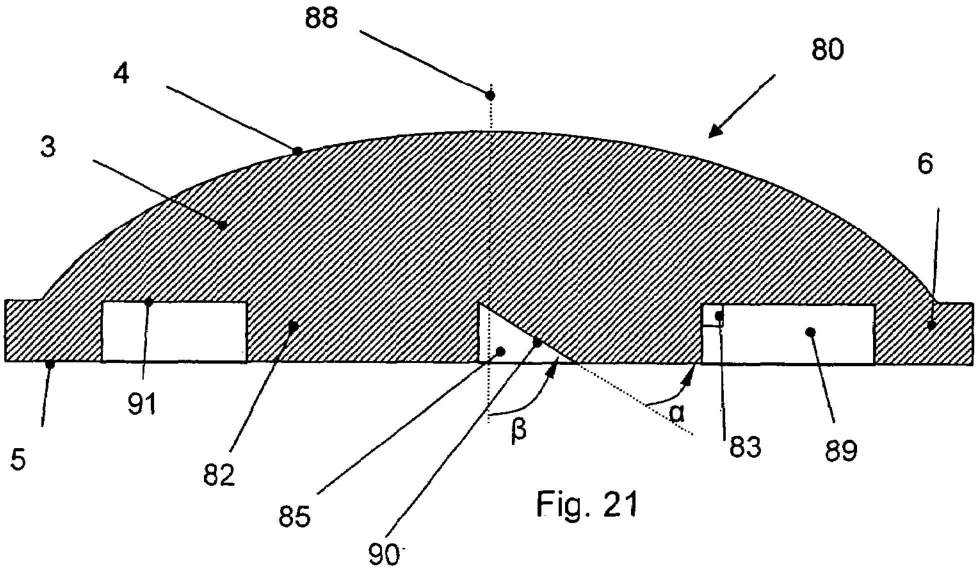

Further advantages and details come to light from the following description of exemplary embodiments. The figures show:

FIG. 1 a motor vehicle,

FIG. 2 a schematic representation of a vehicle headlight,

FIG. 3 an exemplary embodiment for a headlight lens for a vehicle headlight, FIG. 4 the headlight lens according to FIG. 3 in a rear view, FIG. 5 a cross section of the headlight lens according to FIG. 3 and FIG. 4, FIG. 6 a further cross section of the headlight lens according to FIG. 3 and FIG. 4, FIG. 7 a further cross section of the headlight lens according to FIG. 3 and FIG. 4, FIG. 8 a further cross section of the headlight lens according to FIG. 3 and FIG. 4, FIG. 9 a further exemplary embodiment for a headlight lens for a vehicle headlight, FIG. 10 the headlight lens according to FIG. 9 in a rear view, FIG. 11 a cross section of the headlight lens according to FIG. 9 and FIG. 10, FIG. 12 a further cross section of the headlight lens according to FIG. 9 and FIG. 10, FIG. 13 a further exemplary embodiment for a headlight lens for a vehicle headlight, FIG. 14 a further exemplary embodiment for a headlight lens for a vehicle headlight, FIG. 15 a further exemplary embodiment for a headlight lens for a vehicle headlight, FIG. 16 the headlight lens according to FIG. 15 in a rear view, FIG. 17 a further exemplary embodiment for a headlight lens for a vehicle headlight, FIG. 18 the headlight lens according to FIG. 17 in a rear view, FIG. 19 a cross section of the headlight lens according to FIG. 17 and FIG. 18, FIG. 20 a further exemplary embodiment for a headlight lens for a vehicle headlight and FIG. 21 a cross section of the headlight lens according to FIG. 20.

FIG. 1 shows a motor vehicle 100 having a vehicle headlight 1, represented schematically in FIG. 2, having a light source 10 for producing light, a reflector 12 for reflecting light producible by light source 10 and a screen 14. Vehicle headlight 1 also includes a headlight lens 2, 2A, 2B, 2C for changing the beam direction of light producible by light source 10, headlight lens 2, 2A, 2B, 2C including a lens body 3 made of a transparent material, which includes an essentially flat surface 5 facing light source 10 and an essentially convex surface 4 facing away from light source 10. Headlight lens 2, 2A, 2B, 2C also includes an (optional) rim 6, by which headlight lens 2, 2A, 2B, 2C may be attached in vehicle headlight 1.

FIG. 3 shows headlight lens 2, 2A, 2B, 2C in an exemplary embodiment in a top view in the direction of the arrow 16 represented in FIG. 2, and FIG. 4 shows the headlight lens 2, 2A, 2B, 2C in a top view in the direction of the arrow 15 represented in FIG. 2. On the essentially flat surface 5 of headlight lens 2, 2A, 2B, 2C that is facing light source 10, an emblem 20, 20A, 20B, 20C is situated in an exemplary embodiment as writing.

FIG. 5 shows a cross section of the headlight lens 2 along sectional line A-A according to FIG. 4. In the case of headlight lens 2, emblem 20 extends in a relief-like manner beyond essentially flat surface 5 facing light source 10 at a height H between 0.2 mm and 6 mm, in the present exemplary embodiment 2 mm. That is to say, a basal surface 25 of emblem is offset with respect to the essentially flat surface 5 facing light source 10 by between 0.2 mm and 6 mm (in the direction of an optical axis of headlight lens 2 (not shown)), in the present exemplary embodiment by 2 mm.

FIG. 6 shows a cross section of the headlight lens 2A along sectional line A-A according to FIG. 4. In the case of headlight lens 2A, emblem 20A is situated in a recess 21A in lens body 3 and extends in particular in a relief-like manner beyond a bottom surface 22A of recess 21A. Recess 21A has a depth T between 0.2 mm and 6 mm, in the present exemplary embodiment 4 mm. Emblem 20A has a height between 0.2 mm and 6 mm, in the present exemplary embodiment 2 mm, so that a basal surface 25A of emblem 20 lies below essentially flat surface 5 facing light source 10.

FIG. 7 shows a cross section of the headlight lens 20B along sectional line A-A according to FIG. 4. In the case of headlight lens 2B, emblem 20B is situated in a recess 21B in lens body 3 and extends in particular in a relief-like manner beyond a bottom surface 22B of recess 21B. Recess 21B has a depth between 0.2 mm and 6 mm, in the present exemplary embodiment 2 mm. Emblem 20B has a height between 0.2 mm and 6 mm, in the present exemplary embodiment 2 mm, so that a basal surface 25B of emblem 20B ends with the essentially flat surface 5 facing light source 10.

FIG. 8 shows a cross section of a headlight lens 2C along sectional line A-A according to FIG. 4, emblem 20C extending between 0.2 mm and 6 mm, in the present exemplary embodiment 2 mm, deep into lens body 3, so that a basal surface 25C of emblem 20C is offset with respect to essentially flat surface 5 facing light source 10 by between 0.2 mm and 6 mm (in the direction of an optical axis of headlight lens 2C (not shown)), in the present exemplary embodiment by 2 mm.

It may be provided that basal surfaces 25, 25A, 25B, 25C and/or bottom surfaces 22A, 22B have a region having a roughness of at least 0.05 μm, in particular at least 0.08 μm.

FIG. 9 shows a further exemplary embodiment of a headlight lens 30, 30A for use in vehicle headlight 1 as an alternative to headlight lenses 2, 2A, 2B, 2C in a top view in a direction corresponding to the direction of arrow 16 represented in FIG. 2, and FIG. 10 shows headlight lens 30, 30A in a top view in a direction corresponding to the direction of arrow 15 represented in FIG. 2, where—as also in reference to the other figures—identical reference characters also designate identical elements or elements of the same kind. On the essentially flat surface 5 of headlight lens 30, 30A that is facing light source 10, an emblem 31, 31A is positioned in an exemplary embodiment as writing.

FIG. 11 shows a cross section of headlight lens 30 along sectional line B-B according to FIG. 10. In the case of headlight lens 30, emblem 31 is situated in a recess 32 in lens body 3 and extends in particular in a relief-like manner beyond a bottom surface 33 of recess 32. Recess 32 has a depth between 0.2 mm and 6 mm, in the present exemplary embodiment 5 mm. Emblem 31 has a basal surface 35, which, with respect to essentially flat surface 5 facing light source 10 or with respect to an optical axis 38 of headlight lens 30, is sloped in such a way that light entering into lens body 3 through convex surface 4 facing away from light source 10 parallel to optical axis 38 of headlight lens 30 is subject to a total reflection at basal surface 35. In particular it is provided that basal surface 35 with respect to the essentially flat surface 5 facing light source 10 is sloped at an angle α between 25° and 80°, particularly between 35° and 60°, or, with respect to optical axis 38 of headlight lens 30, at an angle β between 10° and 65°, in particular between 30° and 55°. In the present exemplary embodiment it is provided that basal surface 35 with respect to essentially flat surface 5 facing light source 10 is sloped at an angle α of 42.5° and, with respect to optical axis 38 of headlight lens 30, is sloped at an angle β of 47.50° The exemplary embodiment of headlight lens 30 has a shoulder 39 between basal surface 35 and bottom surface 33, which may also be omitted, so that basal surface 35 and bottom surface 33 touch in certain places.

It may be provided that bottom surface 33 has a region having a roughness of at least 0.05 μm, particularly at least 0.08 μm.

FIG. 12 shows a cross section of headlight lens 30A along sectional line B —B according to FIG. 10. In headlight lens 30A, emblem 31A extends into lens body 3, in one refinement of the present invention, however, in no place more than 6 mm. Emblem 31A has a basal surface 35A, which, with respect to essentially flat surface 5 facing light source 10 or with respect to an optical axis 38A of headlight lens 30A, is sloped in such a way that light entering into lens body 3 through convex surface 4 facing away from light source 10 parallel to optical axis 38A of headlight lens 3 is subject to a total reflection at basal surface 35A. In particular it is provided that basal surface 35 with respect to essentially flat surface 5 facing light source 10 is sloped at an angle α between 25° and 80°, particularly between 35° and 60°, or with respect to optical axis 38A of headlight lens 30A at an angle β between 10° and 65°, in particular between 30° and 55. In the present exemplary embodiment it is provided that basal surface 35A with respect to essentially flat surface 5 facing light source 10 is sloped at an angle α of 42° and with respect to optical axis 38A of headlight lens 30A is sloped at an angle β of 48°. The exemplary embodiment of headlight lens 30A has a shoulder 39A between basal surface 35A and the essentially flat surface facing light source 10, which may also be omitted, so that basal surface 35 and essentially flat surface 5 facing light source 10 touch in certain places.

Due to the sloped arrangement of basal surfaces 35 and 35A of emblems 31 and 31A, emblems 31 and 31A in a top view according to FIG. 9 appear to have a silvery coloration—symbolized by the thick shaded portion—and are thus readily visible. In a top view according to FIG. 10, emblems 31 and 31A are transparent except for their edges, so that the ray path of light produced by light source 10 is changed only negligibly by emblems 31 and 31A.

FIG. 13 shows another exemplary embodiment of a headlight lens 40 for use in vehicle headlight 1 as an alternative to headlight lenses 2, 2A, 2B, 2C in a top view in a direction corresponding to the direction of arrow 15 represented in FIG. 2, where—as also in reference to the other figures—identical reference characters also designate identical elements or elements of the same kind. On essentially flat surface 5 of headlight lens 40 that is facing light source 10, an emblem 41 is situated in an exemplary embodiment as writing. Emblem 41 may be developed corresponding to emblem 20, 20A, 20B, 20C, 31 or 31A. Essentially flat surface 5 facing light source 10 includes a region 42 having a (surface) roughness of at least 0.05 μm, in particular at least 0.08 μm, in particular while maintaining a light transmission at the surface of at least 90%. In the present exemplary embodiment, the region has a roughness of 0.33 μm while maintaining a light transmission at the surface of at least 90%.

FIG. 14 shows another exemplary embodiment of a headlight lens 50 for use in vehicle headlight 1 as an alternative to headlight lenses 2, 2A, 2B, 2C in a top view in a direction corresponding to the direction of arrow 16 represented in FIG. 2, where—as also in reference to the other figures—identical reference characters also designate identical elements or elements of the same kind. On essentially flat surface 5 of headlight lens 50 that is facing light source 10, an emblem 51 is positioned in an exemplary embodiment as writing. Emblem 51 may be developed corresponding to emblem 31 or 31A. Essentially convex surface 5 facing away from light source 10 includes a region 52, surrounding emblem 51 in a ring-shaped manner, having a (surface) roughness of at least 0.05 μm, in particular at least 0.08 μm, in particular while maintaining a light transmission at the surface of at least 90%. In the present exemplary embodiment, the region has a roughness of 0.45 μm while maintaining a light transmission at the surface of at least 90%. It may be provided that essentially flat surface 5 of headlight lens 50 that is facing light source 10 includes a region, corresponding to region 42, having a (surface) roughness of at least 0.05 μm, in particular at least 0.08 μm, in particular while maintaining a light transmission at the surface of at least 90%.

It may be provided that bottom surfaces 22A, 22B and/or 33 completely or partly have a (surface) roughness of at least 0.05 μm, particularly at least 0.08 μm, particularly while maintaining a light transmission at the surface of at least 90%.

FIG. 15 shows another exemplary embodiment of a headlight lens 60 for use in vehicle headlight 1 as an alternative to headlight lenses 2, 2A, 2B, 2C in a top view in a direction corresponding to the direction of arrow 16 represented in FIG. 2, and FIG. 16 shows headlight lens 60 in a top view in a direction corresponding to the direction of arrow 15 represented in FIG. 2. On essentially flat surface 5 of headlight lens 60 that is facing light source 10, an emblem 61 is situated in an exemplary embodiment as a prism body bounded by boundary surfaces designated by reference characters 65, 66, 67, 68.

Emblem 60 may—in a similar manner as emblem 30A in FIG. 12—extend into the lens body or extend in a relief-like manner beyond essentially flat surface 5 facing light source 10 or a part of essentially flat surface 5 facing light source 10. Emblem 60 may also be situated in a recess in the lens body, it extending in this development in a similar manner as emblem 30 in FIG. 11—in a development of the present invention in a relief-like manner beyond a bottom surface of the recess.

Boundary surfaces 65, 66, 67, 68 are sloped with respect to essentially flat surface 5 facing light source 10 or with respect to an optical axis of headlight lens 60 in such a way that light entering into lens body 3 through the convex surface 4 facing away from light source 10 parallel to the optical axis of headlight lens 60 is subject to a total reflection at boundary surfaces 65, 66, 67, 68. In particular it is provided that boundary surfaces 65, 66, 67, 68 with respect to essentially flat surface 5 facing light source 10 is sloped at an angle between 25° and 80°, particularly between 35° and 60, or with respect to the optical axis of headlight lens 60 at an angle between 10° and 65°, in particular between 30° and 55°. In the present exemplary embodiment it is provided that boundary surfaces 65, 66, 67, 68 with respect to essentially flat surface 5 facing light source 10 is sloped at an angle of 47° and with respect to optical axis of headlight lens 60 is sloped at an angle of 43°.

Due to the sloped arrangement of boundary surfaces 65, 66, 67, 68, emblem 61 in a top view according to FIG. 15 appears to have a silvery coloration—symbolized by the thick shaded portion—and is thus readily visible. In a top view according to FIG. 16, emblem 61, on the other hand, is transparent except for the edges of boundary surfaces 65, 66, 67, 68, so that the ray path of the light produced by light source 10 is changed only negligibly by emblem 61. Boundary surfaces 65, 66, 67, and 68 may be understood as being embodiments of basal surfaces in terms of the claims.

It may be provided that essentially flat surface 5 facing light source 10 and/or essentially convex surface 4 facing away from light source 10 have a region having a roughness of at least 0.05 μm, particularly at least 0.08 μm. This region includes the essential part of essentially flat surface 5 facing light source 10 and/or the essential part of essentially convex survace 4 facing away from light source 10, but not, however, boundary surfaces 65, 66, 67, 68.

FIG. 17 shows a further exemplary embodiment of a headlight lens 70 for use in vehicle headlight 1 as an alternative to headlight lenses 2, 2A, 2B, 2C in a top view in a direction corresponding to the direction of arrow 16 represented in FIG. 2, and FIG. 18 shows headlight lens 70 in a top view in a direction corresponding to the direction of arrow 15 represented in FIG. 2, where—as also in reference to the other figures—identical reference characters also designate identical elements or elements of the same kind. On essentially convex surface 4 of headlight lens 70 that is facing away from light source 10, an emblem 71 is positioned in an exemplary embodiment as writing. FIG. 19 shows a cross section of headlight lens 70 along sectional line C-C according to FIG. 18. In headlight lens 70, emblem 71 extends into lens body 3, in one refinement of the present invention, however, in no place more than 6 mm. Essentially flat surface 5 facing light source 10 includes a region 72 having a (surface) roughness of at least 0.05 μm, in particular at least 0.08 μm, in particular while maintaining a light transmission at the surface of at least 90%. In the present exemplary embodiment, region 72 has a roughness of 0.25 μm while maintaining a light transmission at the surface of at least 90%.

FIG. 20 shows another exemplary embodiment of a headlight lens 80 for use in vehicle headlight 1 as an alternative to headlight lenses 2, 2A, 2B, 2C in a top view in a direction corresponding to the direction of arrow 16 represented in FIG. 2, where—as also in reference to the other figures—identical reference characters designate identical elements or elements of the same kind. FIG. 21 shows a cross section of headlight lens 80 along sectional line D-D according to FIG. 20. On the essentially flat surface 5 of headlight lens 80 that is facing light source 10, an emblem 81 is situated in a recess 89 in an exemplary embodiment as a beetle having a trunk 82, legs 83, a head 84 and ladybug spots 85.

Trunk 82, legs 83, head 84 and ladybug spots 85 have different heights and/or different surface roughnesses, in particular of at least 0.05 μm, more in particular of at least 0.08 μm. Ladybug spots 85 each have a basal surface 90, which, with respect to essentially flat surface 5 facing light source 10 or with respect to an optical axis 88 of headlight lens 80, is sloped in such a way that light entering into lens body 3 through convex surface 4 facing away from light source 10 parallel to optical axis 88 of headlight lens 80 is subject to a total reflection at basal surfaces 90. In particular it is provided that basal surfaces 90 with respect to essentially flat surface 5 facing light source 10 is sloped at an angle $\alpha$ between 25° and 80°, particularly between 35° and 60°, or with respect to optical axis 88 of headlight lens 80 at an angle $\beta$ between 10° and 65°, in particular between 30° and 55°. In the present exemplary embodiment it is provided that basal surfaces 90 with respect to essentially flat surface 5 facing light source 10 is sloped at an angle $\alpha$ of 45° and with respect to optical axis 88 of headlight lens 80 is sloped at an angle $\beta$ of 45°.

Due to the sloped arrangement of basal surfaces 90 of ladybug spots 85, ladybug spots 85 in a top view according to FIG. 20 have a silvery coloration—symbolized by the thick shaded portion—and are thus readily visible. In a top view from the rear, ladybug spots 85 are transparent except for their edges, so that the ray path of light produced by light source 10 is changed only negligibly by ladybug spots 85.

It may be provided that one of bottom surfaces 91 of recess 89 has a region having a roughness of at least 0.05 μm, more in particular of at least 0.08 μm, in particular while maintaining a light transmission at the surface of at least 90%.

It is in particular provided that a projection of basal surfaces 25, 25A, 25B, 25C, 35, 35A, 90 or of boundary surfaces 65, 66, 67, 68 onto essentially flat surface 5 to face light source 10 covers less than 30% of essentially flat surface 5 to face light source 10 or that a projection of basal surfaces 25, 25A, 25B, 25C, 35, 35A, 90 or of boundary surfaces 65, 66, 67, 68 onto essentially convex surface 4 to face away from light source 10 covers less than 30% of essentially convex surface 4 to face away from light source 10.

Essentially flat surface 5 to face light source 10 may also be developed in a somewhat curved manner. An essentially flat surface in the sense of the present invention may also include a—convexly or concavely—curved surface, the radius of curvature of which, however, is greater, in particular by more than double, than the radius of curvature of the essentially convex surface.

The elements, dimensions, angles and surface relations in the figures are drawn with simplicity and clarity in mind, and not necessarily to exact scale. Thus, for example, the orders of magnitude of some elements, dimensions, angles or surface relations are depicted with considerable exaggeration as compared to other elements, dimensions, angles or surface relations, in order to improve understanding of the exemplary embodiments of the present invention.

What is claimed is:

1. A headlight lens for a vehicle headlight having a light source, the headlight lens including:

a lens body made of a transparent material, which includes a surface to face the light source and a surface to face away from the light source; and an emblem, situated on the surface to face the light source, having a basal surface, which, with respect to the surface to face the light source or with respect to an optical axis of the headlight lens, is sloped in such a way that light entering into the lens body through the surface to face away from the light source parallel to the optical axis of the headlight lens is subject to a total reflection at the basal surface.

2. The headlight lens as recited in claim 1, wherein the basal surface is offset by between 0.2 mm and 6 mm with respect to the surface to face the light source.

3. The headlight lens as recited in claim 1, wherein the emblem extends in a relief-like manner beyond a part of the surface to face the light source or of the surface to face away from the light source or is situated in a recess in the lens body.

4. The headlight lens as recited in claim 3, wherein the emblem extends in a relief-like manner beyond a bottom surface of the recess.

5. The headlight lens as recited in claim 1, wherein a projection of the basal surface onto the surface to face the light source covers less than 30% of the surface to face the light source or a projection of the basal surface onto the surface to face away from the light source covers less than 30% of the surface to face away from the light source.

6. The headlight lens as recited in claim 1, wherein the surface to face the light source or the surface to face away from the light source includes:

a region having a roughness of at least 0.05 μm.

7. A headlight lens for a vehicle headlight having a light source, the headlight lens including:

a lens body made of a transparent material, which includes a surface to face the light source and a surface to face away from the light source; and an emblem, situated on the surface to face the light source, having a basal surface, which, with respect to the surface to face the light source, is sloped at an angle between 20° and 80° or, with respect to an optical axis of the headlight lens, is sloped at an angle between 30° and 55°.

8. The headlight lens as recited in claim 7, wherein the basal surface is offset by between 0.2 mm and 6 mm with respect to the surface to face the light source.

9. The headlight lens as recited in claim 7, wherein the emblem extends in a relief-like manner beyond a part of the surface to face the light source or of the surface to face away from the light source or is situated in a recess in the lens body.

10. The headlight lens as recited in claim 9, wherein the emblem extends in a relief-like manner beyond a bottom surface of the recess.

11. The headlight lens as recited in claim 7, wherein a projection of the basal surface onto the surface to face the light source covers less than 30% of the surface to face the light source or a projection of the basal surface onto the surface to face away from the light source covers less than 30% of the surface to face away from the light source.

12. The headlight lens as recited in claim 7, wherein the surface to face the light source or the surface to face away from the light source includes:

a region having a roughness of at least 0.05 μm.

13. A headlight lens for a vehicle headlight having a light source, the headlight lens including a lens body made of a transparent material, which includes an essentially flat surface and an essentially convex surface; and an emblem, situated on the essentially flat surface, having a basal surface, which, with respect to the essentially flat surface or with respect to an optical axis of the headlight lens, is sloped in such a way that light entering into the lens body through the essentially convex surface parallel to the optical axis of the headlight lens is subject to a total reflection at the basal surface, or which, with respect to the essentially flat surface, is sloped at an angle between 25° and 50° or, with respect to an optical axis of the headlight lens, is sloped at an angle between 30° and 55°.

14. The headlight lens as recited in claim 13, wherein the basal surface is offset by between 0.2 mm and 6 mm with respect to the essentially flat surface.

15. The headlight lens as recited in claim 13, wherein the emblem extends in a relief-like manner beyond a part of the essentially flat surface or of the essentially convex surface or is situated in a recess in the lens body.

16. The headlight lens as recited in claim 15, wherein the emblem extends in a relief-like manner beyond a bottom surface of the recess.

17. The headlight lens as recited in claim 13, wherein a projection of the basal surface onto the essentially flat surface covers less than 30% of the essentially flat surface or a projection of the basal surface onto the essentially convex surface covers less than 30% of the essentially convex surface.

18. The headlight lens as recited in claim 13, wherein the essentially flat surface or the essentially convex surface includes:

a region having a roughness of at least 0.05 μm.

19. A vehicle headlight, the vehicle headlight including:

a light source;

a lens made of a transparent material, which includes a surface facing the light source and a surface facing away from the light source; and an emblem, situated on the surface facing the light source, having a basal surface, which, with respect to an optical axis of the headlight lens, is sloped in such a way that light entering into the lens body through the surface facing away from the light source parallel to the optical axis of the headlight lens is subject to a total reflection at the basal surface, or which, with respect to the surface facing the light source, is sloped at an angle between 25° and 80° or, with respect to an optical axis of the headlight lens, is sloped at an angle between 30° and 55°.

20. The vehicle headlight as recited in claim 19, wherein the basal surface is offset by between 0.2 mm and 6 mm with respect to the surface facing the light source.

21. The vehicle headlight as recited in claim 19, wherein the emblem extends in a relief-like manner beyond a part of the surface facing the light source or of the surface facing away from the light source or being situated in a recess in the lens body.

22. The vehicle headlight as recited in claim 21, wherein the emblem extends in a relief-like manner beyond a bottom surface of the recess.

23. The vehicle headlight as recited in claim 19, wherein a projection of the basal surface onto the surface facing the light source covers less than 30% of the surface facing the light source or a projection of the basal surface onto the surface facing away from the light source covers less than 30% of the surface facing away from the light source.

24. A motor vehicle, the motor vehicle including;

a vehicle headlight as recited in claim 19.

25. A headlight lens for a vehicle headlight having a light source, the headlight lens including:

a lens body made of a transparent material, which includes a surface to face the light source and a convex surface to face away from the light source; and an emblem, situated on a surface out of the group comprising:

the surface to face the light source, the emblem having a basal surface, which is offset by between 0.2 mm and 6 mm with respect to the surface to face the light source; and the surface to face away from the light source, the emblem having a basal surface, which is offset by between 0.2 mm and 6 mm with respect to the surface to face away from the light source.

* * * * *

UNITED STATES PATENT AND TRADEMARK OFFICE

CERTIFICATE OF CORRECTION

PATENT NO. : 7,303,319 B2
APPLICATION NO. : 11/074984
DATED : December 4, 2007
INVENTOR(S) : Holtz et al.

It is certified that error appears in the above-identified patent and that said Letters Patent is hereby corrected as shown below:

In the first page, at Section (73), change “Doctor Optics GmbH (DE)” to --Docter Optics GmbH (DE)--;

Signed and Sealed this

Twenty-seventh Day of October, 2009

David J. Kappos
*Director of the United States Patent and Trademark Office*